Sept. 15, 1970  E. A. COWGILL  3,528,684
TRAILER HITCH ASSEMBLY
Filed Feb. 14, 1969  2 Sheets-Sheet 1
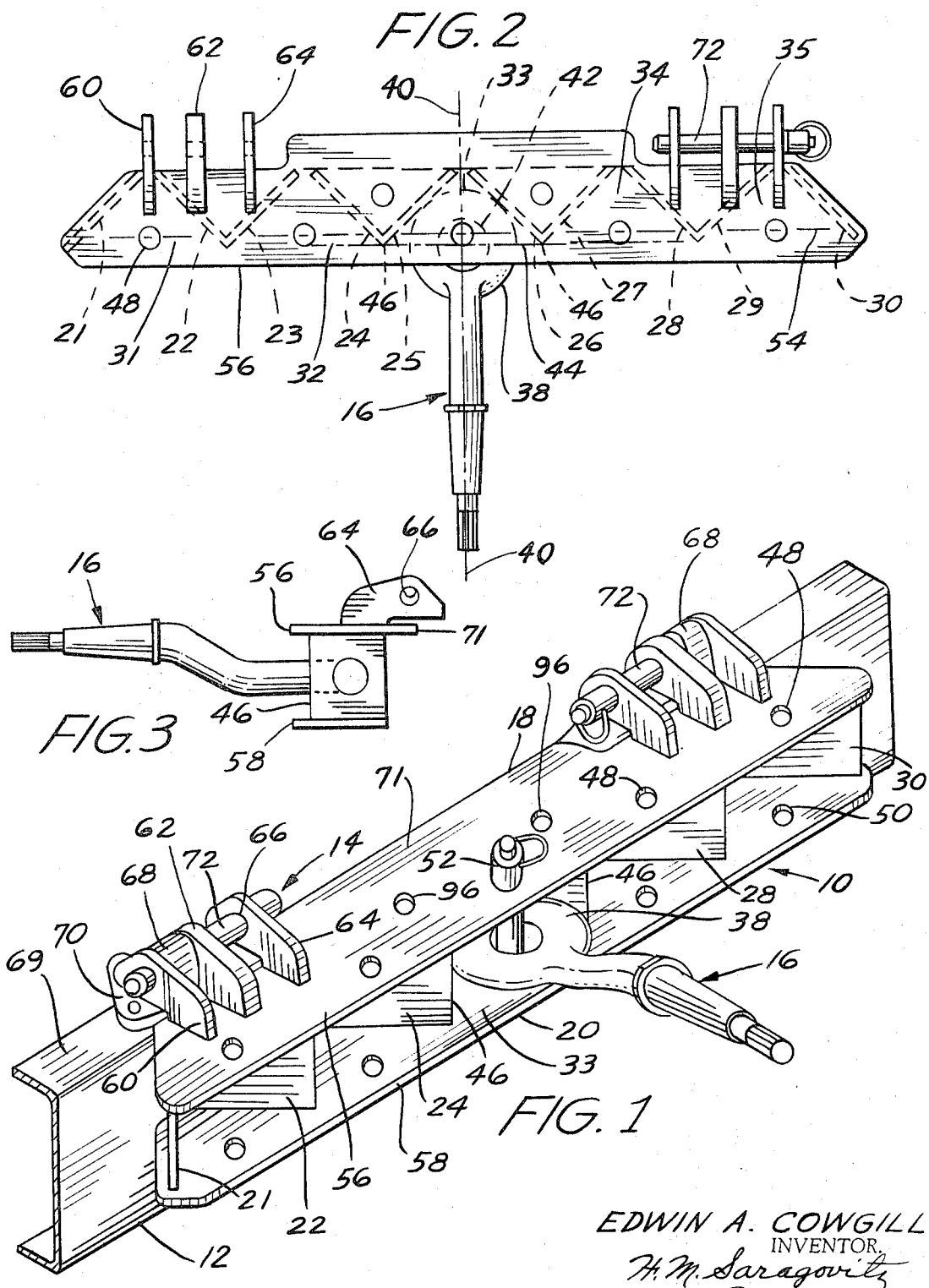
EDWIN A. COWGILL
INVENTOR
H. M. Saragovitz
BY E. J. Kelly
H. Berl
E. P. Barthel
ATTORNEYS Sept. 15, 1970  E. A. COWGILL  3,528,684
TRAILER HITCH ASSEMBLY
Filed Feb. 14, 1969  2 Sheets-Sheet 2

EDWIN A. COWGILL
INVENTOR.
H. M. Saragovitz
BY E. J. Kelly
H. Berl
and E. P. Barthel
ATTORNEYS United States Patent Office 3,528,684
Patented Sept. 15, 1970

3,528,684
TRAILER HITCH ASSEMBLY
Edwin A. Cowgill, Anchorville, Mich., assignor to the United States of America as represented by the Secretary of the Army
Filed Feb. 14, 1969, Ser. No. 799,306
Int. Cl. B60d 3/00
U.S. Cl. 280—456                    10 Claims

ABSTRACT OF THE DISCLOSURE

A trailer hitch adapted for mounting at the front or rear of a prime mover such as a truck, tractor, fork-lift truck or like drive vehicle. The hitch has a plurality of horizontally spaced pockets for connecting a trailer having a cooperatively engageable lunette type coupler that will self-align itself with the hitch allowing the drive vehicle to push as well as pull the trailer unit. The lunette may be moved into alternate ones of the pockets to provide off-center positioning of the lunette for increased maneuverability of the trailer.

The invention described herein may be manufactured, used and licensed by or for the Government for governmental purposes without payment to me of any royalty thereon.

BACKGROUND OF THE INVENTION

Field of the invention

This invention relates to a trailer hitch for vehicles and more particularly to a detachable trailer hitch for allowing the prime mover to push as well as pull trailers having lunette type couplers.

Description of the prior art

Trailer hitches of the type described in the U.S. Pat. 2,409,399, granted Oct. 15, 1946, to Alfred F. Solon, illustrate the use of hitches when the pulling vehicle carries hook means at the rear of its frame and the trailer has a towbar with a ring at the end commonly referred to as a lunette type coupler. The trailer hitch device of the Solon patent provides means to guide the drawbar ring to the securing hook when the drive vehicle is backed up toward the trailer to connect the vehicles.

There has been a need for a detachable trailer hitch device for use in loading trailers and other towed equipment aboard aircraft, ships and like such as landing craft employed by the military which will allow the prime mover to push as well as pull the trailer unit. This increases maneuverability because in most instances it is much easier to push a trailer into a small confined space rather than back the trailer into such a position.

SUMMARY

Applicant's solution to the deficiencies found in the prior art trailer hitches is the design of a multiple pocket hitch capable of being mounted on various prime movers such as commercial and military trucks ranging from quarter-ton Jeeps to 25 ton trucks as well as other vehicles such as fork-lift trucks. By means of this invention a hitch is provided that allows the lunette of the towed vehicle to be guided into a cooperatively engageable attaching position so that only the manual insertion of a hitch pin is required to accomplish the connection of the vehicles. The resultant elimination of the need for a workman to position himself between the trailer and tractive vehicle during the time that the hookup is taking place not only saves but prevents possible injury to the workman.

By virtue of applicant's multiple-pocket design achieved by the accordion-fold arrangement of wall members, the lunette may be moved into alternate ones of the pockets either to expedite the hitching operation during short movements of the trailer as well as to achieve off-center positioning for maneuvering purposes.

It is therefore an object of the present invention to provide a trailer hitch assembly that can be used on a prime mover to push as well as tow a vehicle.

It is another object of the instant invention to provide a trailer hitch assembly having a multiple-pocket arrangement that allows an off-center connection between the vehicles.

It is still a further object of the present invention to provide a detachable hitch assembly such that it can be interchangeably mounted on various sized vehicle bumpers.

A further object of the present invention is to provide a vehicle hitch assembly for use with a fork-lift truck type vehicle.

It is still another object of the invention to provide a vehicle hitch assembly so constructed that the hitch also serves as a combined vehicle bumper and trailer hitch.

BRIEF DESCRIPTION OF THE DRAWINGS

FIG. 1 is a perspective view of the trailer hitch of the instant invention mounted on a vehicle bumper;
FIG. 2 is a top plan view of the trailer hitch;
FIG. 3 is an end view of the hitch of FIG. 2.

DESCRIPTION OF THE PREFERRED EMBODIMENTS

Figure 4:
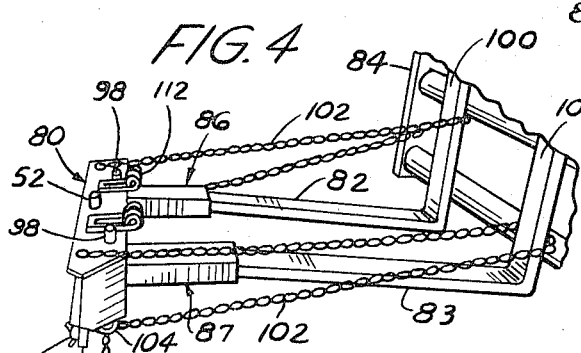
FIG. 4 is a perspective view of the trailer hitch mounted on a fork-lift truck.
Figure 5:
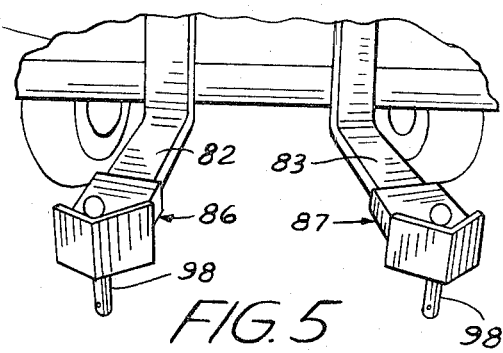
FIG. 5 is a perspective view of the front of the fork lift truck with the hitch removed.

Referring now to the drawings, there is shown in FIG. 1 a vehicle trailer hitch, generally indicated by numeral 10, fixedly secured to a heavy-duty transverse bumper bar 12 of inwardly opening channel configuration, which bumper bar is disposed at one end of a prime mover such as a tactical vehicle used in military operations. The bumper bar 12 extends substantially the full width of the vehicle while the trailer hitch 10 is detachably secured to the central portion thereof.

The trailer hitch assembly 10, shown engaging the lunette 16 of the trailer to be moved, is formed by spaced horizontal upper and lower plate members indicated by the numerals 18 and 20, respectively interconnected by pairs of oblique vertical wall members. As best shown in FIG. 2 each pair of vertical well members, designated by the numerals 21 through 30 inclusive, are arranged in chevron-like fashion so as to have an overall accordion-fold configuration defining a plurality of V-shaped pockets indicated by the numerals 31 through 35 inclusive. As each of the pockets 31–35 are identical only the center pocket 33 defined by the vertical paired walls 25 and 26 will be discussed in detail.

As seen in FIG. 2 the ring portion 38 of the lunette 16 is shown seated within the pocket 33 such that the ring is tangent to the side walls 25 and 26 respectively at a point substantially equidistant from their ends. It will be observed in the preferred embodiment that the pair of walls 25 and 26 are oriented at a substantially 90° angle by having each wall 25 and 26 positioned at substantially 45° with reference to the longitudinal center line 40.

By means of the above described arrangement it will be seen that the center of the lunette eye 42 is located such that its transverse center line 44 is positioned substantially tangent to the horizontally spaced arrises formed by the intersection of each pair of the vertical walls each of which is indicated by the numeral 46. Referring to FIG. 1, it can be seen that that upper and lower plate member 18 and 20 have a plurality of vertically aligned apertures 48 and 50 extending therethrough for the reception of a vertical hitch pin such as the one shown at 52.

As best seen in FIG. 2, each pair of apertures 48 and 50 have their centers located on a vertical medial plane that bisects each of the pockets 31–35. The transverse centerline 54, common to all the pairs of apertures 48 and 50, is positioned a defined distance inwardly from the front edges 56 and 58 of the plate members 18 and 20. In this manner when the ring portion of the lunette is positioned to engage the pair of walls of pocket 33, the result is that the associated apertures 48 and 50 of the pocket are in off-set alignment with the eye of the ring 38. It can thus be seen that the lunette is self-centered on the vertical medial plane of the pocket 33 for reception of the hitch pin. It will be noted in FIG. 1 that the diameter of pin 52 is approximately one-half the radius of the eye 42 of the lunette such that relative movement between the coupled lunette and associated walls 25 and 26 forming the V-shaped pocket is a minimum during alternate pushing and pulling operations of the prime mover.

While various means may be used to detachably connect the hitch to a vehicle, the manner employed in the embodiment of FIGS. 1–3 comprise two spaced groups of three rearwardly presented ears 60, 62 and 64 secured to the upper surface of plate 18 by welding or otherwise with each group having aligned apertures 66. In a similar fashion, forwardly projecting lugs 68 are mounted as by welding to a base plate 70 secured on the upper flange 69 of the bumper 12. The upper plate 18 is provided with a central flange portion 71 extending rearwardly an amount such that when this portion is disposed on the upper flange 69 of the bumper 12 the apertures in the ears 60, 62 and 64 are in alignment with the corresponding apertures in the lugs 68 are dimensioned to be received between the pair of outermost ears 60 and 62. The numeral 72 marks a connective pin having a head 74 so that when the pin is thrust into the apertures of ears, and through the apertures of the bumper lug it will readily secure the hitch in operative position.

As best shown in FIG. 2 the vertical edges 46 are positioned a defined distance rearwardly from the plate edges 56 and 58 to insure that the lunette will be retained in vertical alignment between the plates 18 and 20 prior to the movement of the lunette within a selected pocket. It will also be appreciated that the vertical spacing of the plates 18 and 20 is approximately three times the cross-sectional diameter of the ring 38 to insure tolerance for ease of vertical alignment while providing for freedom of pivotal movement of the lunette in a vertical plane about the pin 52 during movement of the connected vehicles.

The hitch has particular application in cargo handling such as in military operations requiring the loading and unloading semi-trailers, towed howitzers, and other equipment into aircraft, navy landing ships (generally referred to as LST's) or other carriers with confined or otherwise inaccessible space. In these instances the vehicles and trailers can be arranged before loading, so that by means of the subject hitch, a tractive vehicle can back aboard the carrier hauling the trailer by means of the pivotal lunette connection. Once on board the carrier the hitch assembly has a pushing capability which allows the tractive vehicle to be used to push the normally towed trailer. This procedure further increases the speed of the loading operation as it is easier to push a trailer into a small confined space than it is to back the trailer into such a position.

The required loading time of the carrier is further reduced by being able to attach the tractive vehicle to the lunette of the trailer by bringing them into general contact position without the need for a precise alignment, either vertical or horizontal. The multiple pocket concept not only serves the purpose of ready attachment for limited travel but allows for an off-center connection between the vehicles when desired for precise maneuvering.

FIGS. 4–7 are directed to another embodiment of the invention which in part, is identical to that previously described and, therefore, like numerals have been employed with respect to corresponding parts. In this embodiment of the invention the trailer hitch assembly, generally indicated by the numeral 80, is shown attached to the forks 82 and 83 of a fork-lift truck partially indicated at 84 by means of mounting members 86 and 87 respectively.

Figure 6:
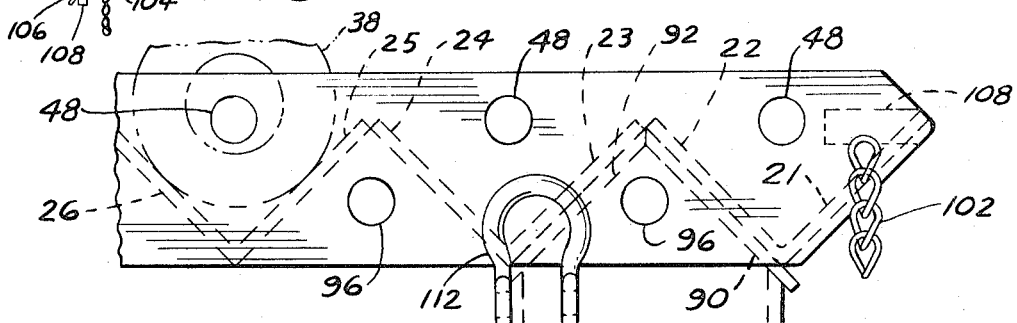
FIG. 6 is a top plan enlarged view of a portion of the hitch of FIG. 4 showing details of the mounting means.
Figure 7:
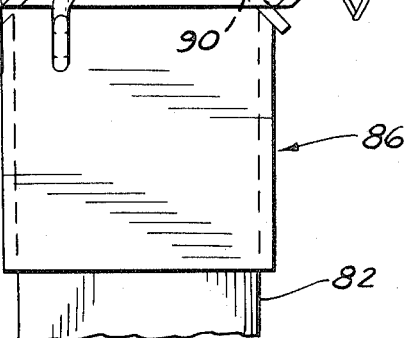
FIG. 7 is an enlarged perspective view of the mounting sleeve of FIG. 6.

As each mounting member is identical only the member 86 is shown in detail in FIGS. 6 and 7. The member 86 comprises a hollow rectangular sleeve portion 88 dimensioned to be slidably received on the fork 82 and has vertical plates 90 and 92 formed in a V-shaped section and secured, as by welding, to the forward end of the sleeve 88. It will be noted in FIG. 6 that the upper and lower plates of the sleeve 88 are shaped with pointed end portions to position to the plates 90 and 92 as shown at an angle of substantially 90° to conform with the vertical walls 22 and 23 forming one of a plurality of rearwardly facing V-shaped pockets on the trailer hitch.

The upper and lower plates of the sleeve 88 have aligned holes 94 which match with holes 96 in the upper and lower plates 18 and 20 of the trailer hitch. An aperture, not shown, is also provided in the end of each fork for the reception of a securing pin 98 to retain the mounting member 86 on the fork 82.

Figure 8:
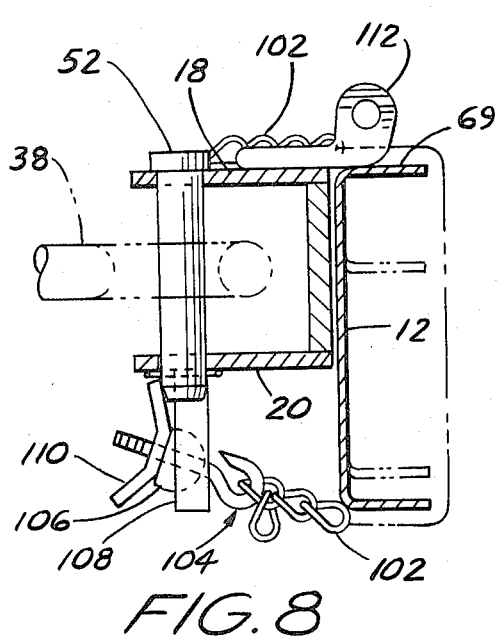
FIG. 8 is a side view, partly in section, of an alternative bumper mounting arrangement for applicant's trailer hitch.

For retaining the rearwardly facing outboard trailer hitch pickets in engagement with the mounting members 86 securing chains 102 are connected to the trailer hitch 80 and to a suitable portion of the fork lift truck, such as the vertical portions 100 and 101 respectively, of the forks 82 and 83. Each of the securing chains 102 is secured to the upper plate 18 by suitable means such as by welding. Underneath the trailer hitch each of the chains 102 is held by a hook pin 104 (FIG. 4) threadably retained in the ball portion 106 of ball socket lugs 108 located on the base plate 20 of the hitch and secured thereto by wing nut 110 (FIG. 8). The right chain 102 is secured as close as practicable to the right end of the hitch and left chain 102 as close as practicable to the left end of the hitch for the development of optimum holding forces.

Details of the hook pin and cooperating ball and socket arrangement are shown in FIG. 8 which discloses an alternate bumper attaching means for applicant's hitch to be described in detail below. It should be noted here that the ball socket lugs 108 could be located on the top plate 18, if desired, to prevent possible damage thereto by striking the ground.

It will thus be seen that applicant's hitch can be readily attached to a fork lift track by use of the mounting sleeves 86 and 87 secured on the forks 82 and 83. When installed on a fork-lift vehicle the hitch can be lowered for engagement with the lunette and subsequently automatically raised for movement of the trailer.

Because of applicant's unique accordion-fold arrangement of the pairs of walls 21–30 the structure provides rearwardly facing V-shaped pockets which allow for the reception of the V-shaped plates 90, 92 therein. This arrangement attains a secure attaching means capable of withstanding large loads while requiring the use of merely a single pin means readily inserted through the aligned apertures in the hitch, sleeve and associated fork for secure retention thereon. To secure the hitch 80 on the fork-lift truck previously mentioned lengths of chains 102 are used as shown in FIG. 4.

The hitch shown in FIG. 8 has a modified securing means comprising a pair of brackets 112 mounted on the upper plate 18 such that the hitch can be mounted on various size vehicle bumpers in a manner similar to the vehicle hitch 10 described above. It will be noted that in the modification of FIG. 8 the bottom surface of the brackets 112 rest directly on the upper surface of the bumper flange, such as flange 69 of bumper 12, similar to the central flange 71 of the hitch 10. In this manner the hook pin 104 can be used to secure the chain 102 after it encircles the bumper with the ball socket arrangement allowing the hook pin 104 to pivot to the desired angle to accommodate various size bumpers, indicated by the phantom lines of FIG. 8. It will be noted that the brackets 112 can be used to cooperate with suitable lugs located on the bumper to further secure the hitch in a fashion similar to the lugs 68 and ears 62, 64 used in the arrangement of FIG. 1.

While the invention has been described and illustrated in connection with a single lunette tow bar, it is to be understood that applicant's trailer hitch could be used with a double tow bar arrangement of the type generally shown in U.S. Pat. 2,444,844, issued July 13, 1948. Such a tow bar could also be of the A-frame type with the outermost pocket on each end receiving a ring portion on each leg of the A. It is also clear that applicant's hitch structure could be used as the actual bumper structure so as to be an integral portion of the vehicle without departing from the scope of the invention.

I claim:

1. In a trailer hitch for engaging the lunette of the vehicle to be moved, a framework adapted for attachment to a vehicle comprising:
    spaced horizontally disposed upper and lower plate members;
    said plate members being interconnected by pairs of vertically disposed wall members arranged in generally accordion-fold configuration defining a plurality of V-shaped pockets into which the selectively coupled,
    means to retain the lunette within the pocket; and
    means for attaching the trailer hitch to the tracive vehicle.

2. In a trailer hitch as defined in claim 1 wherein:
    said upper and lower plate members each having aligned apertures for the reception of a hitch pin therethrough; and
    each of said V-shaped pockets arranged at an angle to seat the lunette such that the eye of the lunette is in alignment with a pair of said plate apertures to receive the hitch pin therethrough.

3. In a trailer hitch as defined in claim 2, wherein each of said V-shaped pockets define an angle of substantially ninety degrees.

4. In a trailer hitch as defined in claim 1, wherein the vertical edges formed by said pairs of wall members are located a defined distance from the edges of said plate members.

5. In a trailer hitch as defined in claim 1, wherein said means for removably attaching the trailer hitch to the tractive vehicle comprises bracket members mounted on said upper plate member and extending rearwardly cooperating with lug members on the vehicle bumper upper surface to place the trailer hitch in the mounted position.

6. In a trailer hitch as defined in claim 1, wherein said means for removably attaching the trailer hitch to the tractive vehicle comprising:
    flexible tie means positioned adjacent each end of said hitch,
    one end of each of said tie means being attached to one of said plate members, the other end of said tie means attached to hook means on the remaining plate member after encircling the vehicle bumper.

7. The attaching means as defined in claim 6, wherein each of said hook members have pivot support means for universal pivotal motion such that the trailer hitch may be removably attached to different size vehicle bumpers.

8. The attaching means as defined in claim 7, wherein said pivot support means is a ball and socket type universal connection.

9. In a trailer hitch as defined in claim 1, wherein said means for attaching the trailer hitch to the tractive vehicle comprising:
    coupling sleeve members mounted on the end portions of the tines for a fork-lift type vehicle for engaging selective rearwardly opening pockets of the trailer hitch, and
    tie means on the end portions of the trailer hitch for attaching the trailer hitch to the coupling sleeve members.

10. In a trailer hitch as defined in claim 9, wherein said coupling sleeve members have V-shaped end portions conforming to the rearwardly facing V-shaped pockets for reception therein.

References Cited

UNITED STATES PATENTS

| 2,247,664 | 7/1941  | Osman          | 280—481   |
| 2,492,914 | 12/1949 | Barden         | 293—69 X  |
| 2,604,349 | 7/1952  | Martinez       | 280—500 X |
| 2,923,268 | 2/1960  | Fletcher et al.| 280—456 X |

FOREIGN PATENTS 948,845  9/1956  Germany.

LEO FRIAGLIA, Primary Examiner

U.S. Cl. X.R.

280—467, 481, 491, 505; 293—69